No. 855,189. PATENTED MAY 28, 1907.
B. LJUNGSTRÖM.
CENTRIFUGAL LIQUID SEPARATOR.
APPLICATION FILED DEC. 16, 1904.
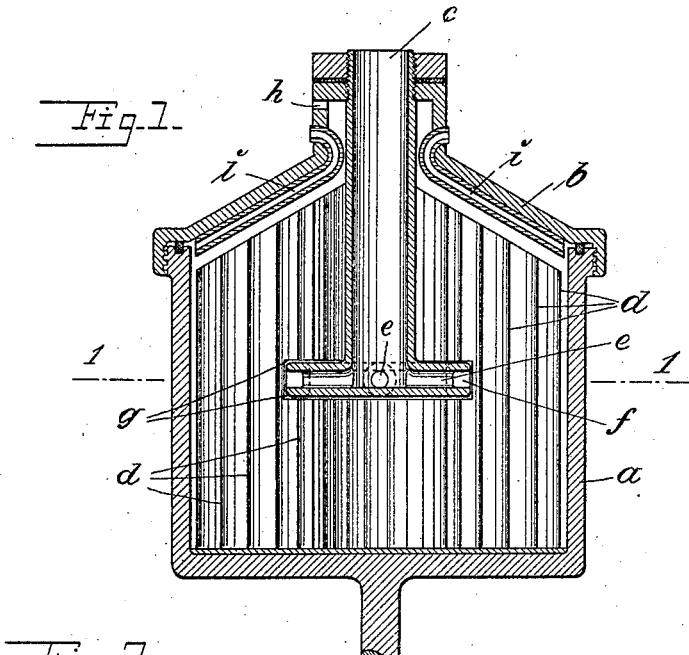
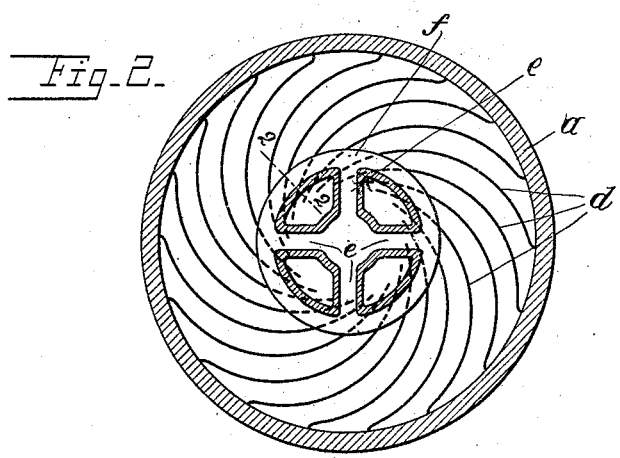
Witnesses.
Harry L. Ames.
R. W. Sommers.
Inventor.
Birger Ljungström.
by Henry Orth
Attys.

UNITED STATES PATENT OFFICE.

BIRGER LJUNGSTRÖM, OF STOCKHOLM, SWEDEN, ASSIGNOR TO AKTIEBOLAGET SEPARATOR, OF STOCKHOLM, SWEDEN, A COMPANY.

CENTRIFUGAL LIQUID-SEPARATOR.

No. 855,189.

Specification of Letters Patent.

Patented May 28, 1907.

Application filed December 16, 1904. Serial No. 237,114.

*To all whom it may concern:*

Be it known that I, BIRGER LJUNGSTRÖM, a subject of the King of Sweden, residing at Stockholm, Sweden, have invented certain new and useful Improvements in Centrifugal Liquid-Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of liquid separators, in which in the liquid space of the bowl there is a plurality of upright blades or plates which intersect the radial line of the bowl.

My invention relates specifically to the improvement in the feed device for this class of separators wherein the milk is injected between the outer and the inner edges of adjacent plates outside the cream-wall.

A feed device of this kind consists of bent ribs, provided with narrow slits or openings communicating with the interior of the central feed pipe and opening into the spaces between the curved plates of partitions.

As well known, the skimming capacity of a cream separator is essentially dependent upon the skimming surface of the bowl liner. The greater the number of skimming plates and the nearer to each other the same are placed within a certain limit, the greater skimming capacity the bowl has, i. e. the greater quantity of milk can be separated in the bowl per unit of time. For this reason the plates in modern cream separators of this kind are placed at a distance from each other, which at the inner edges do not exceed 0.4 to 0.8 mm. With such small spaces between the plates it is obvious that the device above described cannot be used because there is no place for such inlet devices. And even if such bent ribs could be placed between the plates, the slits would be very narrow and thus very difficult to cleanse.

My invention has for object another feed device, by which the new milk is distributed between the curved plates outside the cream wall in the neutral zone of the creamer, but which does not possess the above mentioned disadvantages.

I will now describe the embodiment of my invention as shown in the annexed drawings.

Figure 1 is a vertical section through the bowl of a centrifugal separator and Fig. 2 is a cross-section on line 1—1, Fig. 1. Fig. 3 is a cross-section on line 2—2, Fig. 2, of the distributing ring.

$a$ is the bowl, $b$ is the cover, $c$ the feed or supply pipe, $d$ a plurality of upright plates intersecting the radial line of the bowl. The central feed tube $c$, reaching only to one-half of the height of the bowl or thereabout, is, as shown on the drawing, at the bottom provided with radial pipes $e$, the other ends of which communicate with the interior of a ring $f$, concentric to the feed tube and opening outward as shown especially on the cross-section, Fig. 3. The distance from the center line of the bowl to the outer end of this ring $f$ is greater than the radial distance from the said central line to the inner wall of the liner. In consequence thereof notches $g$ are made in each plate at the same height and corresponding to the ring $f$, in order that this one may enter the circular recess thus formed. By the separating process the cream, as well known, forms a cylindrical layer, whose outer wall coincides with the inner wall of the liner, or nearly so, and the radial extension of the ring is therefore thus chosen so, that the milk conducted to the same through the hollow arms or pipes may be thrown out behind the cream wall in the neutral zone.

Owing to the rotation of the bowl the milk, on leaving the pipes is thrown out in tangential direction in the spaces between the upright plates. In these spaces the separating process takes place in the well known manner whereby the separated cream passes toward the center and farther upward, escaping through the cream outlet $h$, whereas the skim milk passes the outer circumference of the bowl and escapes through the skim milk pipes $i$.

Having now fully described my invention, what I claim, and desire to protect by Letters Patent, is:

1. In a centrifugal creamer, a liner consisting of a plurality of upright plates intersecting the radial line of the bowl, each of said plates having its inner edge cut away forming an annular recess, a ring mounted in said recess opening toward the wall of the bowl and a central feed tube communicating with said ring.

2. In a centrifugal creamer, a liner consisting of a plurality of upright plates intersecting the radial line of the bowl, each of said plates having its inner edge cut away forming an annular recess about midway of the height of the bowl, a ring in said recess having an opening facing the inner wall of the bowl, the distance between said opening and the center of the bowl being greater than the distance between said center and the inner edges of the plates, a central feed tube, and radial pipes connecting the latter with the interior of the ring.

3. In a centrifugal creamer, a liner consisting of a plurality of upright plates intersecting the radial line of the bowl, each of said plates having a rectangular notch in its inner edge forming an annular recess in the liner, and means to direct new milk into said recess.

4. In a centrifugal creamer, a liner consisting of a plurality of upright curved plates intersecting the radial line of the bowl, each of said plates having a rectangular notch in its inner edge between its ends forming an annular recess in the liner, and means to direct new milk into said recess.

In testimony, that I claim the foregoing as my invention, I have signed my name in presence of two subscribing witnesses.

BIRGER LJUNGSTRÖM.

Witnesses:
 TH. WAWRINSKY,
 HARRY ALBIHN.